Aug. 15, 1950  A. E. REEVES  2,518,571
FILM PRINTING DEVICE
Filed July 27, 1946  2 Sheets-Sheet 1
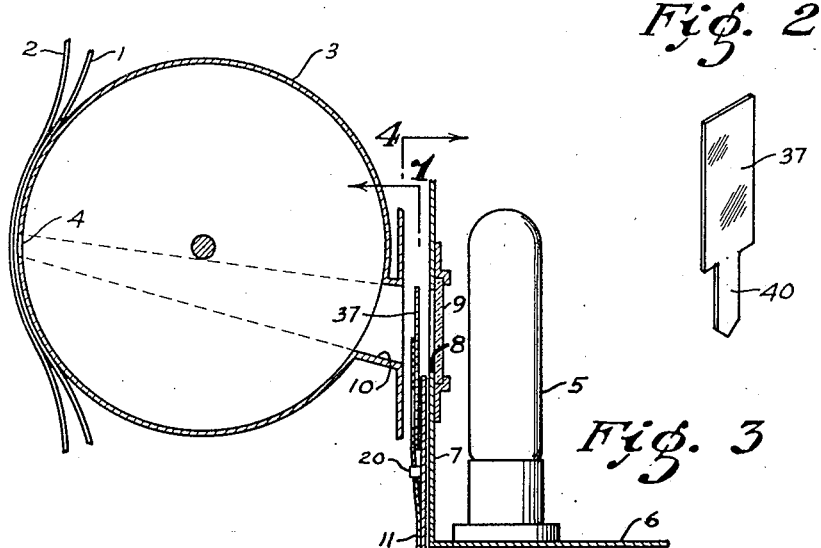
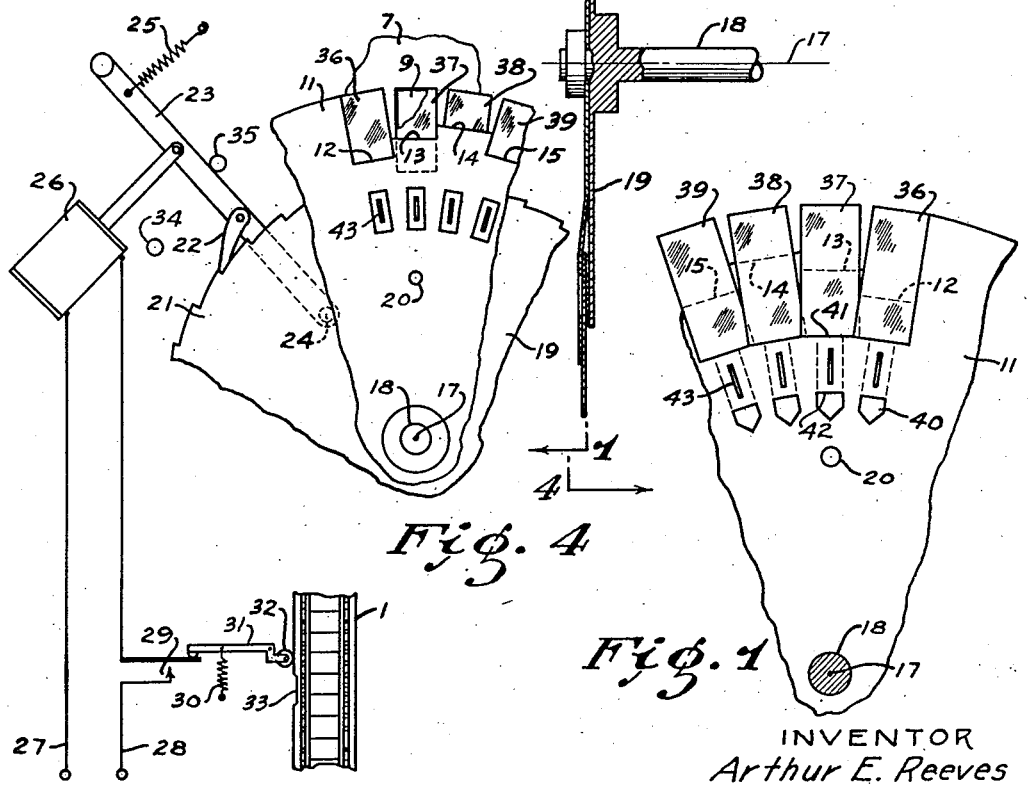
INVENTOR
Arthur E. Reeves
BY John Flann
ATTORNEY Aug. 15, 1950    A. E. REEVES    2,518,571
FILM PRINTING DEVICE
Filed July 27, 1946    2 Sheets-Sheet 2
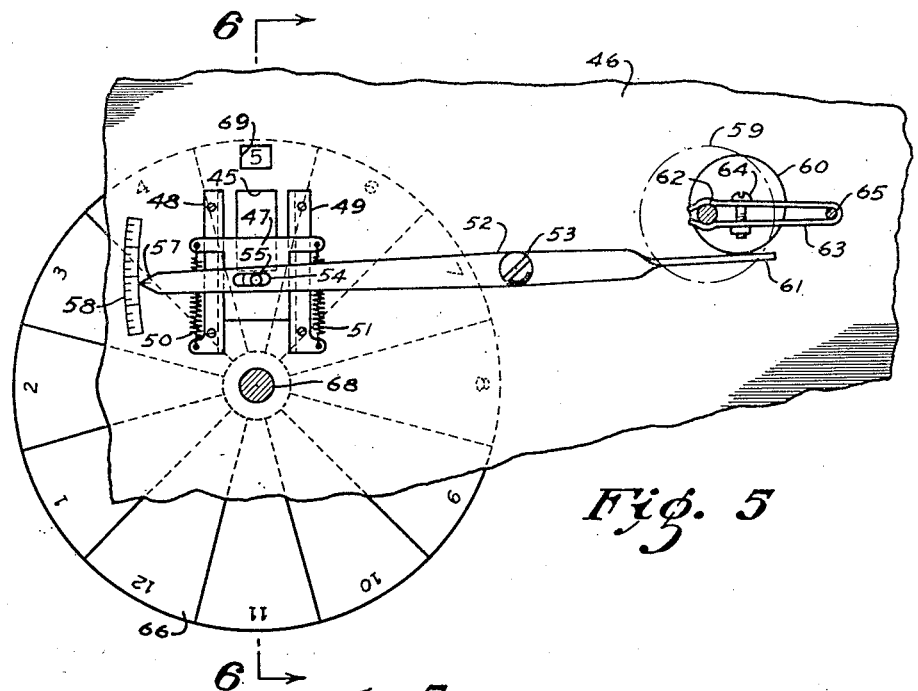
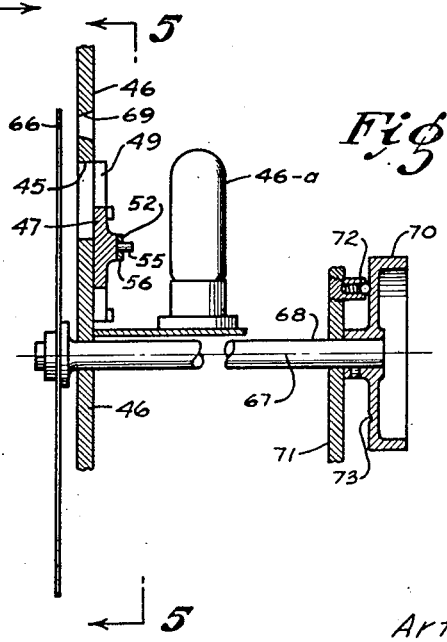
INVENTOR
Arthur E. Reeves
BY John Flam
ATTORNEY Patented Aug. 15, 1950

2,518,571

UNITED STATES PATENT OFFICE 2,518,571

FILM PRINTING DEVICE

Arthur E. Reeves, Westwood, Calif.

Application July 27, 1946, Serial No. 686,638

5 Claims. (Cl. 95—75)

This invention relates to a printing device for making prints from a transparency, such as a motion picture film.

A motion picture film invariably includes a number of scenes, arranged sequentially. These scenes may be taken indoors or outdoors, and under varying light conditions. The cameraman, although he may predetermine the correct exposure for photographing each scene, is yet incapable of ensuring that the negative will be of uniform density. Accordingly, insofar as the negative is concerned, the density of the film is likely to be different for each successive scene.

However, it is essential that the positive print have a substantially uniform density, causing the images to be projected on the screen with consistent brilliance. In order that this may be effected, it is now common practice to provide a printer that causes the intensity of the light to vary in accordance with the density of the film, the printing light intensity for each scene being determined in accordance with the density of the negative carrying that scene.

One mode of accomplishing these results is described and claimed in Patent 2,356,885, granted to Arthur E. Reeves on August 29, 1944. In that patent, there is disclosed a disc having a notched periphery, the depth of the notch determining the intensity of light used in printing. The disc may be automatically adjusted about an axis so as to bring in succession, separate parts of the periphery into cooperation with the source of light.

While such a system is entirely satisfactory for printing black and white prints, further factors must be considered when color prints are made. Under such circumstances, filters of different colors and density may be required to obtain an optimum image on the screen.

It is one of the objects of this invention to make it possible in a simple and inexpensive manner, to provide a filter of the required density and color in the path of the printing rays of light.

It is another object of this invention to provide a filter that may be readily incorporated in known forms of printers, such as that described in said patent to Reeves, as well as to other forms.

This invention possesses many other advantages, and has other objects which may be made more clearly apparent from a consideration of several embodiments of the invention. For this purpose there are shown a few forms in the drawings accompanying and forming part of the present specification. The forms will now be described in detail illustrating the general principles of the invention; but it is to be understood that this detailed description is not to be taken in a limiting sense, since the scope of this invention is best defined by the appended claims.

Referring to the drawings:

Figure 1 is an enlarged fragmentary view of a portion of a disc structure embodying the invention, the view being taken along a plane indicated by the line 1—1 of Fig. 3;

Fig. 2 is a pictorial view of one of the color filters used in connection with the disc shown in Fig. 1;

Fig. 3 is a diagrammatic view, mainly in section, of a printer incorporating the mechanism;

Fig. 4 is a fragmentary, diagrammatic view, taken along a plane indicated by line 4—4 of Fig. 3;

Fig. 5 is a fragmentary elevation of a modified form of the invention, the figure being taken along the plane indicated by line 5—5 of Fig. 6; and Fig. 6 is a sectional view, taken along the plane indicated by line 6—6 of Fig. 5.

In the form of the invention illustrated in Figs. 1 to 4, the negative film 1 (Fig. 3) is shown as in contact with raw film 2, upon which a positive print is to be made. The films 1 and 2 are arranged to be moved past an aperture 4 formed in the wall of a hollow stationary drum 3. The printing occurs as the films 1 and 2 pass the aperture 4 through which light is transmitted, actinically affecting the raw film 2 in accordance with the light transmitting qualities of negative 1. The manner in which the films 1 and 2 are progressed with respect to the light aperture 4 is not illustrated, since any well known means can be provided for this purpose.

The source of light, in this instance, is shown as an electric light bulb 5 mounted on a bracket 6 that forms a part of the housing of the light 5. A vertical wall 7 is disposed in front of the bulb 5. Wall 7 is provided with an aperture 8, covered by the light-diffusing element 9 through which the light from bulb 5 is transmitted. The light thus transmitted can enter the drum 3 through an opening 10 at the lower right-hand portion of the drum.

In order to control the intensity of the illumination, the effective area of the opening 10 is controlled by the aid of a disc 11. This disc 11 can be made of thin, opaque material, such as cardboard or fibre, or the like; and its periphery is stepped, as indicated by the lines 12, 13, 14, and 15 in Figs. 1 and 4. These steps are at different distances from the axis 17 of the disc. This axis, as shown most clearly in Fig. 3, is normal to to the plane of the wall 7. The deeper the step, the more of the opening 19 is exposed, and the greater is the illumination that results. Shallower steps, such as 14, for example, mask a larger portion of the aperture 10, and the illumination is reduced.

The manner in which the stepped periphery is formed is described in the patent hereinabove mentioned, and it is not necessary to detail it here. It is sufficient to state that the disc 11 is mounted on a shaft 18 formed with a supporting flange 19. The disc is held in register by the aid of one or more registering pins 20, one of which is shown in Figs. 1 and 4.

For successive scenes on negative film 1, the disc 11 is advanced through uniform angular distances to cause different steps 12, 13, etc., to be interposed in the light beam. This is accomplished in a manner entirely similar to that illustrated in said patent. This mechanism includes ratchet teeth 21 (Fig. 4) formed on a periphery of the flange 19. It is adapted to be moved in a counter-clockwise direction by the aid of an actuating pawl 22 mounted on a lever 23 that has a stationary pivot 24.

The lever 23 is urged in a clockwise direction by a tension spring 25. It is periodically moved in a counter-clockwise direction against the force of spring 25 by the aid of a solenoid 26. This solenoid 26 is actuated from any appropriate source of electrical energy through mains 27 and 28. In main 28 a switch 29 is provided urged to closed position by spring 30 on the switch arm 31. This switch arm 31 carries a roller 32 that is intended to drop into a recess or notch 33 formed in the edge of negative film 1 as it moves past the printing aperture 4. Thus, momentarily, the solenoid 26 is actuated whenever a notch or recess 33 permits the spring 30 to close the switch 29. These notches are placed in appropriate position to cause energization of the solenoid 26 at the beginning of a succeeding scene to be printed.

Accurately equal angular increments are provided by the aid of the angularly spaced stops 34 and 35 in the path of the lever 23.

By this means the print operation is rendered entirely automatic, the right degree of illumination being secured in succession by automatic energization of the solenoid 26.

When printing color film, it is necessary often to correct the color by a filtering process during printing. This is accomplished by interposing an appropriate color filter in the light beam. By the aid of the present invention, this can be effected in a very simple manner.

Thus, for example, thin color filters 36, 37, 38, 39 may be provided to overlie and extend beyond the steps 12, 13, etc., as indicated most clearly in Figs. 1 and 4. The color filters may be made from appropriately colored film, or the like.

These filters are of the general form illustrated in Fig. 2, in which, specifically, filter 37 is illustrated. This is of general rectangular shape, having a reduced downwardly extending pointed projection 40. This projection 40 is arranged to extend through narrow slots 41 and 42 punched in the disc 11, immediately below the corresponding step 13.

Slots 41 and 42 serve adequately to retain these filters on the disc 11; but, in order to ensure positively against displacement, the filters may be stapled to the disc 11, as by the aid of the metal staples 43 that pass through the projections 40, as well as the disc 11.

The filters 36, 37, etc., may be of uniform dimensions. The slots 41 and 42 are also uniformly shaped so that the upper edges 44 of the filters extend a uniform distance from the axis 17. There may be a slight overlapping of adjacent filters at the bottom edge of the filters, but this is immaterial since the active portions of the filters (corresponding to those portions that extend beyond the steps 12, 13, etc.) are separate from each other.

Selection of the required density and color of the filters 36, 37, etc., is effected by the aid of the judgment of the operator in order to correct the color intensity in the finished positive. Once these filters are attached to the disc 11, this disc, with its attached filters, may be used over and over again for printing any number of positive color prints.

In the form of the invention illustrated in Figs. 5 and 6, printing of the film is effected by transmission of light through an aperture 45 disposed in a vertical wall 46. This vertical wall 46 forms a part of the housing for a light bulb 46—a.

Varying intensities of illumination in this instance are provided by the aid of a slide 47 disposed in the parallel guides 48 and 49. When the slide 47 is moved upwardly, the effective area of the aperture 45 is reduced and, conversely, when the slide 47 is moved downwardly, the effective area of the aperture 45 is increased.

In this instance, tension springs 50 and 51 are used to urge the slide 47 downwardly. It may, however, be manually adjusted and moved upwardly against the tension of the springs 50 and 51 by the aid of a lever 52. This lever 52 is provided with a pivot 53 on the wall 46. The lever is provided with a slot 54 accommodating a pin 55 that is attached to the boss 56 on the outer surface of the slide 47. Lever 52 has a pointed extremity 57 cooperating with a graduated scale 58 on the wall 46.

Lever 52 is adapted to be manually adjusted to comply with the requirements of the scenes to be printed. For this purpose use is made of a knob 59 (Fig. 5) that operates a cam 60. The cam 60 serves as a stop for the end 61 of lever 52. This end 61 is urged into contact with the cam 60 by the tension of springs 50 and 51. The knob 59 is mounted on a shaft 62 which is frictionally restrained, as by the hairpin spring 63.

The degree of friction retaining the cam 60 in any desired position may be adjusted by the aid of the bolt 64 which passes through both legs of the spring 63. An anchoring pin 65 passes between the arms of the hairpin spring where it is bent in order to restrain the hairpin spring against angular movement.

In this instance, an angularly adjustable filter disc 66 is provided. This disc is mounted for angular adjustment about an axis 67, as by being supported on a shaft 68. The outer portion of disc 66 is interposed in a beam of light passing through aperture 45. The light, passing through the disc 66, is caused to print from a negative film (not shown) that may be moved past the aperture 45. It may consist of any number of different color transparencies, twelve being shown in this instance and numbered in succession. Color transparency numbered "5" is in the active position for the adjustment illustrated. This numeral "5" can be read through a view aperture 69 formed in the wall 46. In this way, the operator can adjust the disc 66 angularly to comply with the requirements of the printing.

Each of the sectors carrying the numbers 1 to 12 inclusive on disc 66 is a thin color filter of proper graduation and color to make possible a choice of a large number of colors and densities.

Adjustment of the disc 66 can be accomplished by the aid of a knob 70 (Fig. 6) which is attached to the shaft 68. This shaft 68 may be journalled in the wall 46, as well as another stationary wall 71.

In order to provide definite and accurate positions of the angular adjustment, a spring pressed ball 72 is provided, supported on the wall 71. This ball 72 is arranged to be seated in any one of a number of shallow recesses 73 formed in the cooperating face of the knob 70.

In this form of the invention, the setting of the gate or slide 47, as well as the setting of the filter discs 66 are accomplished manually in accordance with the printing instructions.

The inventor claims:

1. In a printing system: a rotatable disc having a stepped periphery, said disc having a plurality of slots therein; a plurality of filter members of substantially rectangular shape extending radially beyond the steps of said disc, each of said members having reduced radially extending pointed projections extending through said slots; and means for securing said extensions to said disc.

2. In a printing system: means forming a beam of light; a disc rotatable about an axis parallel to said beam, said disc having a plurality of peripheral steps; said disc having a plurality of slots parallel to said steps; filter members having a substantially rectangular shape and extending radially beyond said steps, each of said members having a pointed extension radially receivable in said slots; and means for securing said members to said disc.

3. In a printing mechanism: a disc having a stepped periphery; means forming a beam of light transverse to the periphery; means for adjusting said disc to move different portions of the periphery into the path of the beam; a plurality of filter members, each of the same size and shape, disposed adjacent said disc and extending radially beyond the steps of said disc; and means for selectively mounting said members on the disc in symmetrical array about said disc.

4. In a printing system: an opaque member having a plurality of steps at its edge, the width of the steps being uniform, and the depths of the steps being non-uniform; means forming a beam of light; means for intermittently moving said opaque member transversely of the beam to position the steps in succession in the beam; a plurality of filters attached to the member in alignment with the steps to project above the steps of the member, said filters having uniform size and shape; means forming an aperture in the path of the beam after it passes through a filter; said filters together with the member extending completely over said aperture.

5. In a printing system: a rotatable disc having a stepped periphery, said disc having a plurality of slots therein disposed inwardly of the steps of said disc; a plurality of filter members extending radially beyond the steps of said disc to substantially a circle on which the outer circumference of the disc lies, each of said members having reduced radially extending projections extending through said slots; and means for securing said extensions to said disc.

ARTHUR E. REEVES.

REFERENCES CITED

The following references are of record in the file of this patent:

UNITED STATES PATENTS

| Number | Name | Date |
|---|---|---|
| 1,154,607 | Brasseur | Sept. 28, 1915 |
| 1,205,582 | Tessier | Nov. 21, 1916 |
| 1,315,892 | Wilson | Sept. 9, 1919 |
| 1,317,946 | Snively | Oct. 7, 1919 |
| 1,477,131 | Kulik | Dec. 11, 1923 |
| 1,690,617 | Capstaff | Nov. 6, 1928 |
| 1,912,740 | Tuttle | June 6, 1933 |
| 2,117,727 | Jones | May 17, 1938 |
| 2,122,689 | Jones | July 5, 1938 |
| 2,272,646 | Schmidt, et al. | Feb. 10, 1942 |
| 2,337,736 | Cawein | Dec. 28, 1943 |
| 2,356,885 | Reeves | Aug. 29, 1944 |

FOREIGN PATENTS

| Number | Country | Date |
|---|---|---|
| 289,429 | Italy | Oct. 16, 1931 |